United States Patent [19]
Enami

[11] Patent Number: 5,922,485
[45] Date of Patent: Jul. 13, 1999

[54] SOLID POLYMER ELECTROLYTE FUEL CELL

[75] Inventor: Yoshiaki Enami, Kanagawa, Japan

[73] Assignee: Fuji Electric Co., Ltd., Kawasaki, Japan

[21] Appl. No.: 08/956,226

[22] Filed: Oct. 22, 1997

[30] Foreign Application Priority Data

Oct. 22, 1996 [JP] Japan ................................ 8-278492

[51] Int. Cl.⁶ ............................................. H01M 8/04
[52] U.S. Cl. .................... 429/26; 429/19; 429/20; 429/32; 429/34; 429/39
[58] Field of Search ................... 429/13, 17, 19, 429/20, 26, 30, 31, 32, 34, 39

[56] References Cited

U.S. PATENT DOCUMENTS 5,230,966 7/1993 Voss et al. ............................... 429/26

*Primary Examiner*—Maria Nuzzolillo
*Assistant Examiner*—Monique Wills
*Attorney, Agent, or Firm*—Baker & Botts, L.L.P.

[57] ABSTRACT

A solid polymer electrolyte fuel cell characterized by high cell performance, compact size and low cost prevents condensation and liquefaction of moisture in the reactant gases and facilitates uniform cooling in the electrode planes of the unit cells. The solid polymer electrolyte fuel cell features a unit cell structure including separators, each including an oxidant gas inlet, fuel gas inlets, coolant inlets, an oxidant gas outlet, fuel gas outlets and coolant outlets. The inlets are arranged in a peripheral region of the separators and the outlets in a central region of the separators. The oxidant gas, fuel gas and coolant are made to flow from the peripheral region to the central region such that the temperatures of the oxidant and fuel gases are higher near the reactant gas outlets. A continuous coolant flow path is provided by forming protrusions in the reactant gas conduits.

8 Claims, 10 Drawing Sheets

SOLID POLYMER ELECTROLYTE FUEL CELL

BACKGROUND OF INVENTION

The present invention relates to a solid polymer electrolyte fuel cell featuring high cell performance, compact size and low cost, wherein the fuel cell comprises a unit cell structure including a solid polymer electrolyte film as an electrolyte retaining layer and electrodes on both major surfaces thereof. Reactant gases, i.e., fuel and oxidant gases, are supplied to the electrolyte and electrodes to obtain electrical energy by electrochemical reactions. More specifically, the present invention relates to a flow path configuration for the reactant gases and coolant, whereby condensation and liquefaction of moisture in the reactant gases is prevented and uniform cooling of the unit cell is achieved.

FIG. 4 is a cross-sectional view schematically showing the basic unit cell structure of a conventional solid polymer electrolyte fuel cell. As shown in FIG. 4, laminated anode and cathode electrodes 14 and 16, respectively, are arranged to contact with the respective surfaces of a solid polymer electrolyte film 15. Separators 10 and 11, each consisting of a gas-impermeable metal plate, are arranged on the respective outer surfaces of the electrodes 14 and 16. Seal members 17, preferably elastic seal members, are arranged on the side end portions between the separators 10 and 11 and the electrolyte film 15 to keep the electrodes 14 and 16 and the electrolyte film 15 in an air-tight environment.

So arranged, electrolyte film 15, electrodes 14 and 16, separators 10 and 11 and the seal members 17 constitute the unit cell structure of a conventional solid polymer electrolyte fuel cell. The separator 10 is cyclically bent such that an oxidant gas conduit 7 is formed between the separator 10 and the cathode electrode 16. The oxidant gas conduit 7 is used for conducting the flow of oxidant gas within the unit cell and for expelling excess oxidant gas from the unit cell.

The separator 11 is also cyclically bent such that a fuel gas conduit 8 is formed between the separator 11 and the anode electrode 14. The fuel gas conduit 8 is used for conducting the flow of fuel gas within the unit cell, and for expelling excess fuel gas from the unit cell. A coolant for maintaining the fuel cell at a certain temperature flows through a coolant conduit 18 formed between the adjoining separators 10 and 11.

FIG. 5 is a plan view of a conventional separator structure, viewed from the side of the cathode electrode 16 in FIG. 4. As shown in FIG. 5, an oxidant gas inlet 1 and an oxidant gas outlet 2 extend vertically in the direction of lamination, i.e., along the normal to the illustrated plane. A fuel gas inlet 3 and a fuel gas outlet 4 extend vertically in the direction of lamination. A coolant inlet 5 and a coolant outlet 6 also extend vertically in the direction of lamination. The oxidant gas provided from the oxidant gas inlet 1 flows through the oxidant gas conduit 7 winding so that the oxidant gas may be delivered uniformly over the electrode to contribute to the electrochemical reactions. The excess oxidant gas is expelled through the oxidant gas outlet 2.

The solid polymer electrolyte film 15 conventionally comprises a cation conductive film consisting of a cation exchange film of the polystyrene family that includes sulfonic acid groups, a mixture film of fluorocarbon sulfonic acid and polyvinylidene fluoride, a fluorocarbon matrix to which trifluoroethylene is graft-copolymerized, and a perfluorocarbon sulfonic acid film (Nafion Film from Du Pont Co.). The solid polymer electrolyte film 15 includes proton (hydrogen ion) exchange groups in the molecule, and exhibits a resistivity of 20 $\Omega$-cm$^2$ or less at the ordinary temperature when saturated with water, and also functions as a proton-conductive electrolyte. The saturated water content in the film changes reversibly with temperature.

In FIG. 4, the anode and cathode electrodes 14 and 16, respectively, include a catalyst layer containing catalytic material and a electrode base. The electrode base is used for retaining the catalyst layer, for conveying the reactant gases, and for generating an electric current. A three phase boundary is formed between the catalyst layer and the solid polymer electrolyte film 15 by: arranging the catalyst layer in close contact with the solid polymer electrolyte film 15; supplying the fuel gas, including hydrogen, to the anode side; and supplying the oxidizing gas, including oxygen, to the cathode side. Accordingly, electric energy is produced in accordance with electrochemical reactions (1) and (2), through which water is yielded:

At the anode

$$H_2 \rightarrow 2H^+ + 2e^- \tag{1}$$

At the cathode

$$2H^+ + (\tfrac{1}{2})O_2 + 2e^- \rightarrow H_2O \tag{2}$$

The catalyst layer generally includes platinum catalyst small grains, a water repellent fluororesin and fine bores for efficiently diffusing the reactant gases to the three phase boundary. The catalyst layer must form a adequate three phase boundary.

The above-described unit cell structure of FIG. 4 is limited to output voltages of 1 V or less. In order to provide a fuel cell that generates as high an output voltage as practical, many unit cells are laminated together. Typically, the solid polymer electrolyte fuel cell is operated at 50 to 100° C. to lower the resistivity of the film and maintain a high power generating efficiency for the fuel cell.

Since the solid polymer electrolyte film 15 functions as the proton-conductive electrolyte when the resistivity of the solid polymer electrolyte is lowered by saturating the solid polymer electrolyte film 15 (as the electrotype retaining layer) with water, the water content of the solid polymer electrolyte film 15 must be maintained at the saturation level in order to maintain a high power generating efficiency. Therefore, water is supplied to the reactant gases to raise the humidity of the reactant gases. The humidified reactant gases are supplied to the fuel cell thereby suppressing water vaporization from the film and preventing the solid polymer electrolyte film 15 from drying.

The aforementioned water yielded in connection with power generation, as described above, flows through the gas conduits along with excess reactant gases. The water is carried away by the gas conduits and drained externally. Consequently, the water content of the reactant gases has a distribution in the gas flow direction, i.e., the water content of the reactant gases increases in the downstream direction. Therefore, when the gases saturated with water are supplied to the fuel cell, supersaturated moisture is contained in the gases on the outlet side. The supersaturated moisture condenses to form water drops, which in turn prevent diffusion of the reactant gases to the reactive portions of the electrodes.

The resulting condensation consequently lowers the efficiency of the electrochemical reactions within the cell. It is therefore desirable to expel the excess moisture without generating excess condensation in the fuel cell.

FIG. 6(a) is a diagram illustrating the flow of coolant, and FIG. 6(b) is a graph showing the cell temperature distribution in the direction of coolant flow in FIG. 6(a). Conventionally, cell structure is such that reactant gases and coolant flow in the same direction. Due to the heat generated during the electrochemical reactions, the reactant gas temperatures increase along the downstream direction of the fuel cell laminate, as shown in FIG. 6(b). The higher gas temperature on the downstream side serves to retard condensation of the water vapor in the reactant gases. This is desirable in conventional solid polymer electrolyte fuel cells because the power generating efficiency thereby is maintained by moisturizing the reactant gases to saturation, as the unwanted condensation of moisture within the cell would impair the efficiency of the electrochemical reactions.

However, conventional solid polymer electrolyte fuel cells are also characterized by lower cooling efficiency in the downstream direction. As shown in FIG. 6(b), the cell temperature increases in the downstream direction but drops in the vicinity of the outlets due to heat radiation from the end face of the unit cell to air. Therefore, due to lower temperatures near the reactant gas outlets, moisture in the reactant gases condenses in the vicinity of such outlets, thus lowering the power generating efficiency of the unit cell.

Also, in a conventional unit cell structure utilizing the metal separators 10 and 11 as shown in FIG. 4, uniform cooling of the unit cell is difficult to accomplish due to the non-uniformity of the coolant flow paths. This may be further appreciated from FIG. 7, which is a plan view of separators (10, 11) exemplifying the flow path of the coolant in a conventional solid polymer electrolyte fuel cell. As there shown, the coolant flow path is formed by recessed portions (hatched portions) formed on the back surface of the separators (10, 11) in correspondence with the oxidant conduit 7. Coolant flows via the recessed (hatched) portions from the coolant inlet 5 to the coolant outlet 6 in the direction of fuel gas flow, i.e., from the fuel gas inlet 3 to the fuel gas outlet 4. However, as shown in FIG. 7, the coolant flow path is non-uniform and is characterized by many "blind alleys," which contribute to the non-uniform cooling of the unit cell.

FIGS. 8 and 9 are perspective views showing two different combinations of the adjoining separators 10 and 11 in a conventional solid polymer electrolyte fuel cell. In FIG. 8, the oxidant gas conduit 7 of the separator 10 lies on top of the fuel gas conduit 8 of the separator 11. In FIG. 9, the oxidant gas conduit 7 on the separator 10 is displaced by one conduit width from the fuel gas conduit 8 on the separator 11. In both FIGS. 8 and 9, the two separators 10 and 11 contact each other in a hatched metal sealing portion 12, whereby electrical contact is obtained between the two separators 10 and 11. The sealing portion 12 also separates the coolant flow paths.

With either separator configuration as shown in FIGS. 8 and 9, uniform coolant flow and thus uniform cooling in the unit cell is difficult. In the arrangement shown in FIG. 8, uniform coolant flow is impeded by the combed-tooth, blind alley structure of the coolant flow path. In the arrangement shown in FIG. 9, although blind alleys are eliminated, uniform coolant flow is impeded by barriers caused by the convex portions next to the gas conduits 7 and 8.

In order to uniformly cool the electrodes in the electrode plane, a conventional cell structure interposes a conductive member, e.g., a metal plate, a metal mesh or a conductive carbon, between the anode side separator and the cathode side separator such that a flow path is available for the coolant. However, the additional conductive member has the undesired effects of increasing the fuel cell thickness, impairing cell performance due to contact resistance between the conductive member and the separators, and increasing manufacturing costs.

In view of the foregoing, an object of the present invention is to obviate the aforementioned shortcomings of conventional solid polymer electrolyte fuel cells.

A further object of the present invention is to provide a solid polymer electrolyte fuel cell wherein cell performance is not impaired by the condensation and liquefaction of the moisture in the reactant gases flowing through the unit cell.

Another object of the present invention is to provide a solid polymer electrolyte fuel cell characterized by high cell performance and uniform cooling in the electrode planes of the unit cells without employing additional elements, e.g., an additional conductive member.

Still another object of the present invention is to provide a compact solid polymer electrolyte fuel cell that can be manufactured at low cost.

SUMMARY OF THE INVENTION

In accordance with a first aspect of the present invention, a solid polymer electrolyte fuel cell is provided that is characterized by high cell performance, compact size and low cost. The solid polymer electrolyte fuel cell comprises a fuel cell laminate including a plurality of unit cells. Each of the unit cells includes: (1) a flat electrolyte layer comprising a solid polymer electrolyte film, an oxidant electrode disposed on a first major surface of the electrolyte layer, and a fuel electrode disposed on a second major surface of the electrolyte layer; (2) a first separator on the outer surface of the oxidant electrode, the first separator comprising at least one oxidant gas conduit adjacent to the oxidant electrode for conveying oxidant gas for electrochemically generating electric power; (3) a second separator on the outer surface of the fuel electrode, the second separator comprising at least one fuel gas conduit adjacent to the fuel electrode for conveying fuel gas for electrochemically generating electric power; (4) at least one coolant conduit between the adjoining first and second separators, the coolant conduit providing a coolant for maintaining the fuel cell at a certain temperature; (5) at least one coolant inlet arranged in a peripheral region of the fuel cell laminate and at least one coolant outlet arranged in a central region of the fuel cell laminate; and (6) at least one oxidant gas inlet arranged in the peripheral region of the fuel cell laminate and at least one oxidant gas outlet arranged in the central region of the fuel cell laminate; and (8) at least one fuel gas inlet arranged in the peripheral region of the fuel cell laminate and at least one fuel gas outlet arranged in the central region of the fuel cell laminate, the coolant, oxidant gas and fuel gas being introduced through the respective inlets and flowing from the peripheral region to the respective outlets in the central region.

In accordance with another aspect of the present invention, a solid polymer electrolyte fuel cell includes a fuel cell composite, wherein the fuel cell composite includes a plurality of fuel cell laminates and wherein each of the fuel laminates comprises a plurality of unit cells each having the aforementioned unit cell structure. With this cell structure, the coolant, oxidant gas and fuel gas is introduced through respective inlets arranged in a peripheral region of the fuel cell composite and is made to flow to respective outlets arranged in a central region of the fuel cell composite.

Advantageously, the oxidant gas conduit comprises a recess formed on the side of the first separator lying adjacent to the oxidant electrode, the fuel gas conduit comprises a recess formed on the side of the second separator lying adjacent to the fuel electrode, and the coolant conduit comprises recesses formed on adjoining sides of the first and second separators that face away from the oxidant and fuel electrodes respectively. In a preferred embodiment, a plurality of protrusions locally are disposed in either or both of the oxidant and fuel gas conduits to reduce the depth of the oxidant and fuel gas conduits, respectively.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE PREFERRED EMBODIMENTS OF THE INVENTION

Figure 1A:
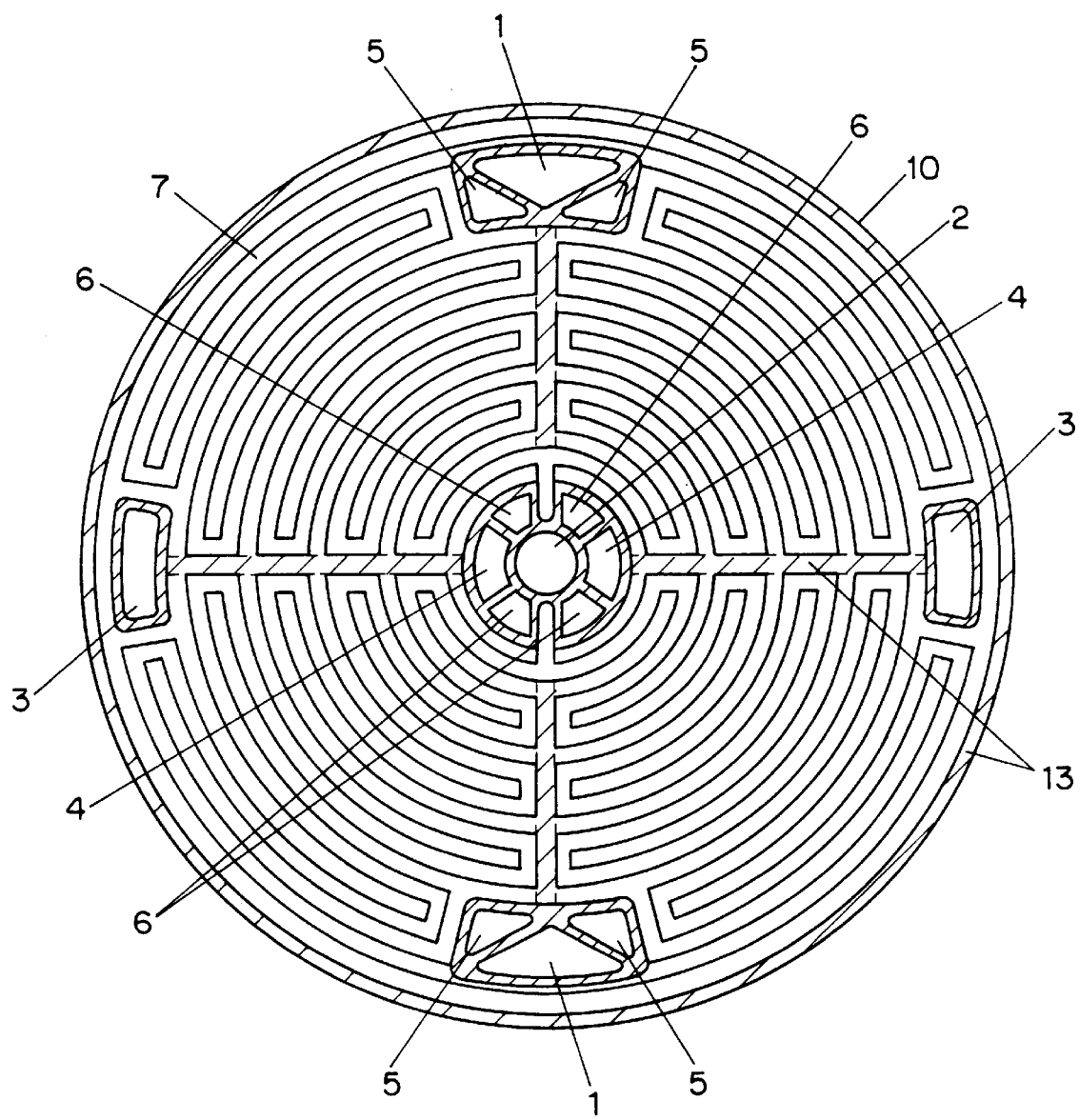
FIG. 1(a) is a plan view of a circular cathode side separator, as viewed from the side of the cathode electrode, according to a first preferred embodiment of the present invention.
Figure 1B:
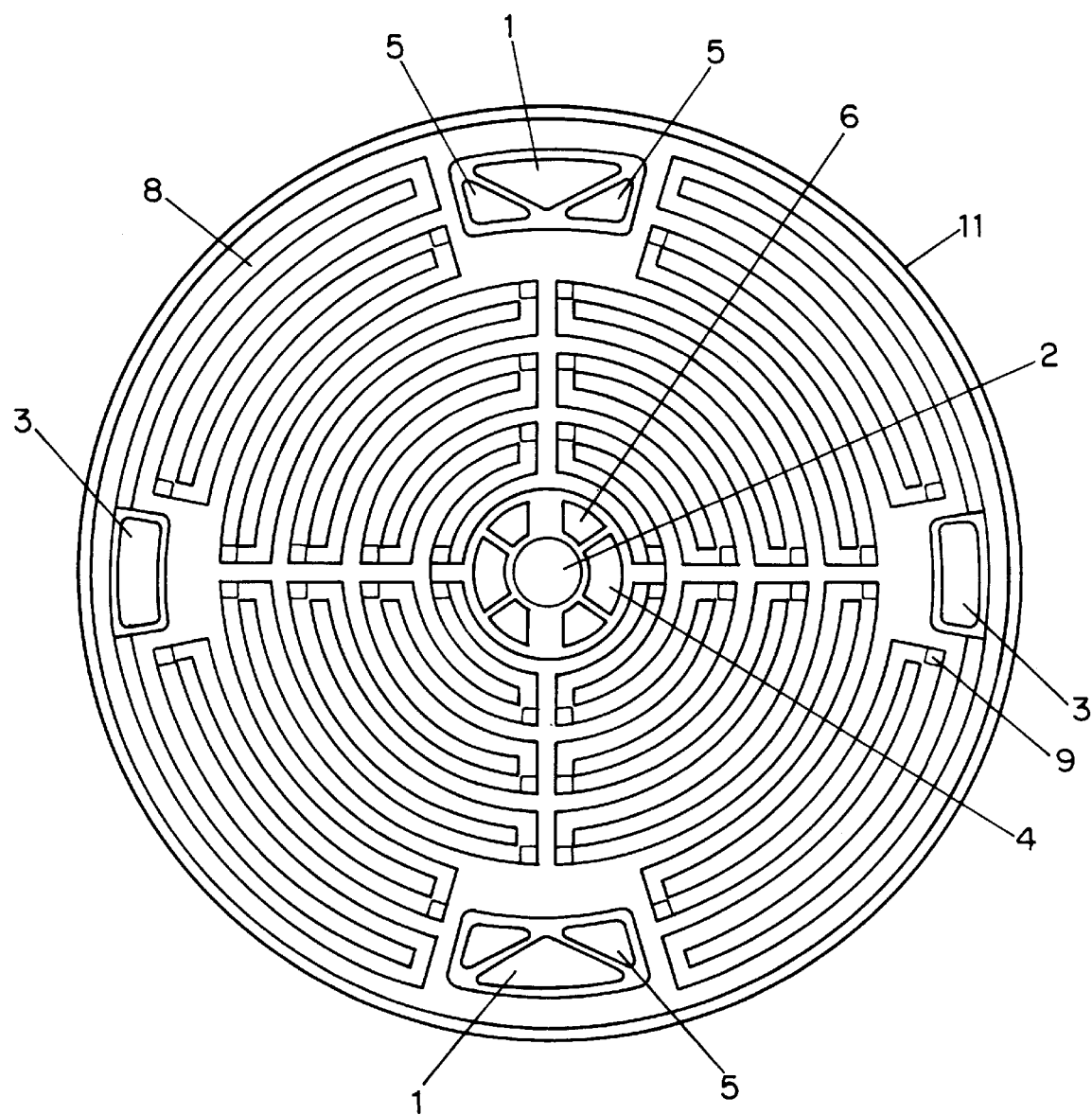
FIG. 1(b) is a plan view of a circular anode side separator, as viewed from the side of the anode electrode, according to the first preferred embodiment of the present invention.

FIGS. 1(a) and 1(b) show circular separators 10 and 11 in accordance with a first preferred embodiment of the present invention. FIG. 1(a) is a plan view of a circular cathode side separator, as viewed from a cathode/oxidant electrode side, according to the first preferred embodiment of the present invention. FIG. 1(b) shows a plan view of a circular anode side separator, as viewed from an anode/fuel electrode side, according to the first preferred embodiment of the present invention.

The circular separators 10 and 11 shown in FIGS. 1(a) and 1(b) are made from machine-formed sheet metal. The circular separators 10 and 11 include two oxidant gas inlets 1, two fuel gas inlets 3 and four coolant inlets 5. These inlets are formed in a peripheral region of the circular separators 10 and 11. The circular separators 10 and 11 also include an oxidant gas outlet 2, two fuel gas outlets 4 and four coolant outlets 6. These outlets are formed in a central region of the circular separators 10 and 11. The oxidant gas supplied to the oxidant gas inlets 1 flows through the serpentine oxidant gas conduits 7 to the central region of the circular separator 10 formed by the press work shown in FIG. 1(a). The oxidant gas is then ejected through the central oxidant gas outlet 2.

Likewise, the fuel gas supplied to the fuel gas inlets 3 flows through the serpentine fuel gas conduits 8 to the central region of the circular separator 1 formed by the press work shown in FIG. 1(b). The fuel gas is then ejected through the central fuel gas outlets 4. The coolant supplied to the four coolant inlets 5 flows through the coolant conduits (not shown) to the coolant outlets 4 in the central region of the circular separators 10 and 11. The coolant conduit is formed by laminating the circular separators 10 and 11 with their back surfaces facing each other. The coolant is ejected through the four central coolant outlets 6 in the circular separators 10 and 11.

The recesses formed on the back surfaces of the circular separators 10 and 11, in conjunction with the press works of the oxidant gas conduits 7 and the fuel gas conduits 8, constitute the coolant conduit. The coolant is supplied to the coolant conduit through coolant inlets 5, and expelled through the four coolant outlets 6. Protrusions 9, which reduce the depth of the fuel gas conduits 8, are formed in the curved portions of the fuel gas conduits 8 on the circular separator 11. The protrusions 9 enable fuel gas flow and facilitate continuous flow of the coolant without causing "blind alleys" in the coolant conduit on the back surface of the circular separator 11. The same effects are also obtained in the oxidant gas conduits 7 by providing protrusions 9 in the curved portions of the oxidant gas conduits 7.

As further shown in FIG. 1(a), sealing portions 13 and elastic seal members (not shown) are interposed between the circular separators 10 and 11 to form an air-tight seal. The sealing portions 13 are arranged on the periphery of the circular separators 10 and 11 and around the inlets 1, 3 and 5 and outlets 2, 4 and 6.

In the circular separators 10 and 11 of FIGS. 1(a) and 1(b), the temperature rises monotonically in a direction from the peripheral region to the central regions. Since the temperatures of the fuel gas and oxidant gas also rise near outlets 2 and 4 of circular separators 10 and 11, moisture in the fuel and oxidant gases is prevented from condensing and liquefying and thus deterioration of the cell performance is avoided. Since the coolant flows smoothly without stagnation, uniform cooling in the separator plate is facilitated and cell performance is improved.

Figure 10A:
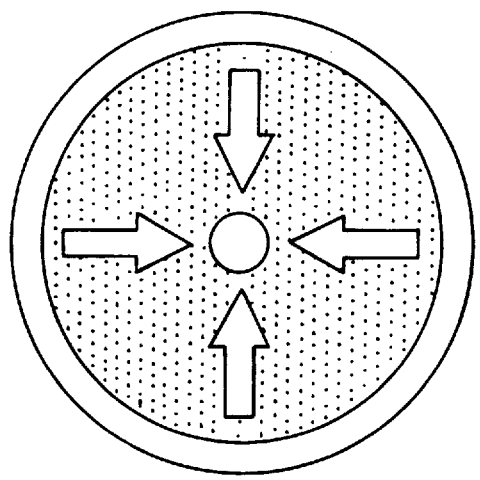
FIG. 10(a) is a diagram illustrating the flow of coolant according to the present invention.
Figure 10B:
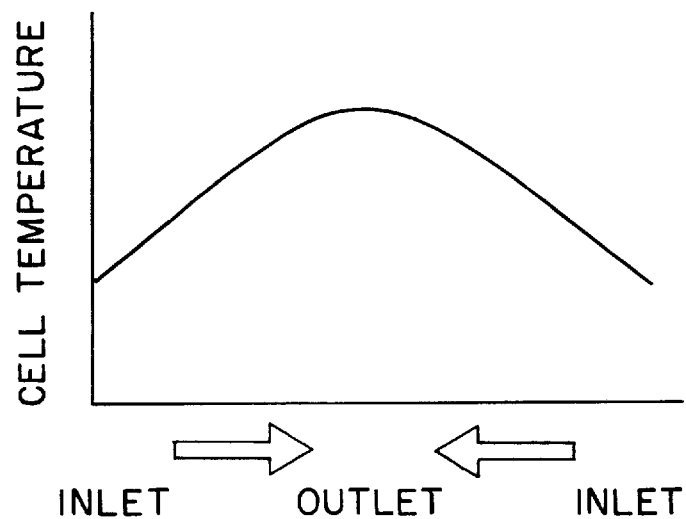
FIG. 10(b) is a graph showing the cell temperature distribution in the direction of coolant flow path as shown in FIG. 10(a)

The temperature characteristics of the circular separators 10 and 11 are further illustrated by FIGS. 10(a) and 10(b). FIG. 10(a) depicts a peripheral (annular) region 20, a center (circular) region 22, and arrows indicating the direction of flow for the reactant gases and the coolant. The direction of coolant flow from a peripheral region to a central region of the fuel cell laminate, as shown in FIG. 10(a), yields a cell temperature profile as shown in FIG. 10(b). As there shown, the cell temperature rises monotonically in the electrode plane from the peripheral region through the central region of the unit cell. Thus, the flow of coolant, oxidant gas and fuel gas from the respective peripheral inlets 1, 3 and 5 to the respective central outlets 2, 4 and 6 prevents condensation and liquefaction of moisture in the oxidant gas and fuel gas.

Figure 11:
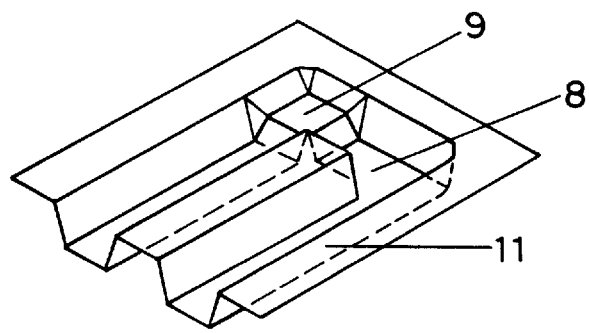
FIG. 11 is a perspective view showing protrusions formed in the curved portions of a fuel gas conduit according to the present invention.
Figure 12:
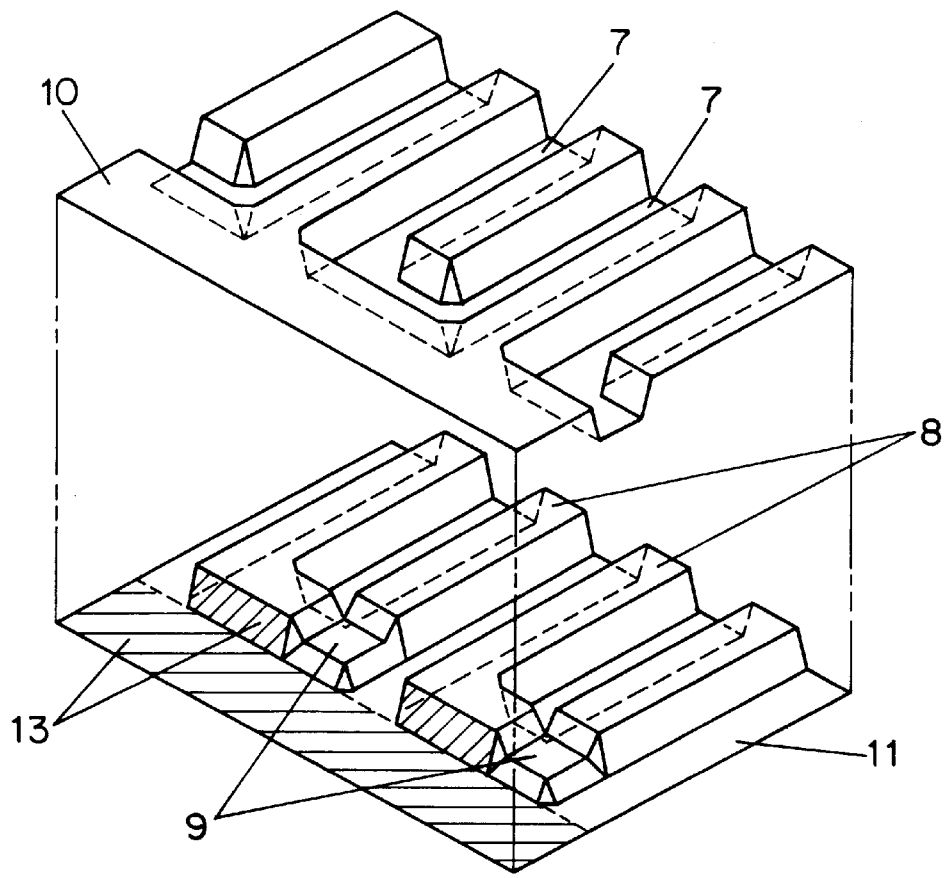
FIG. 12 is a perspective view showing the combination of the two separators, including the protrusions in the reactant gas conduit according to the present invention.
Figure 13:
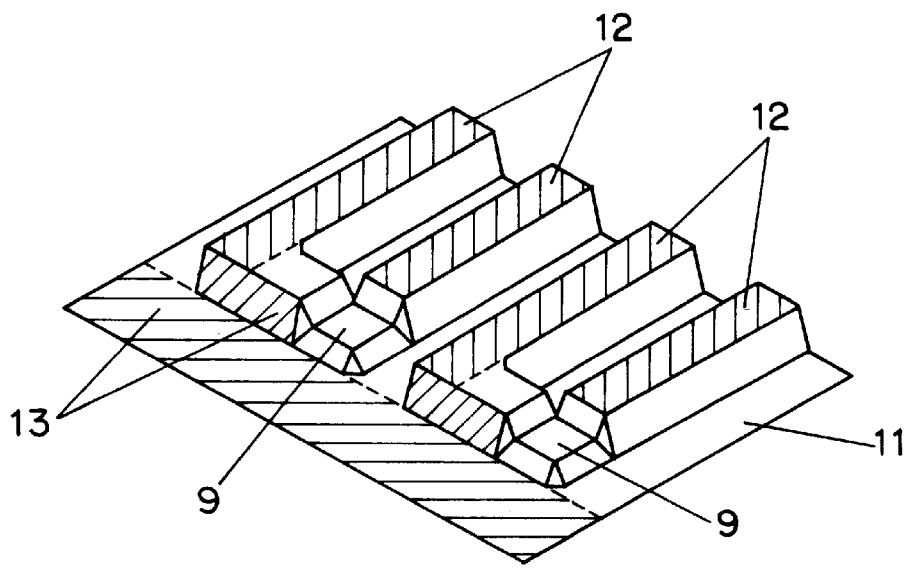
FIG. 13 is a perspective view showing the sealing portions and the coolant conduit formed by the combination of FIG. 12.

Protrusions 9 formed in accordance with the present invention are further shown in FIGS. 11–13. As illustratively shown in FIG. 11, protrusions 9 for reducing the depth of the fuel gas conduit 8 are provided on the anode side of separator 11. The anode separator 11 in combination with a cathode side separator 10, as shown in FIG. 12, are displaced with respect to each other and the hatched sealing portions 13 are sealed with elastic seal members. With exception of the hatched sealing portions 12 and 13 as shown in FIG. 13, a continuous coolant conduit is formed by the protrusions 9 between the separators 10 and 11 of FIG. 12. As further shown in FIG. 13, sealing portions 12 lie on metal surfaces of separator 11.

Therefore, by forming recesses on the electrode side surfaces of the separators and by providing the electrode side recesses with protrusions for reducing the depth of the reactant gas conduits, the protrusions connect the recesses on the opposite separator surfaces to one another such that the connected recesses form a continuous coolant conduit. Since the coolant flows over the low barriers formed by the protrusions, the coolant flows more uniformly in the separator plane. Advantageously, when the protrusions are formed in the curved portions of the reactant gas conduits, "blind alleys" are eliminated and thus a continuous coolant conduit is formed for facilitating continuous flow of the coolant.

Figure 2A:
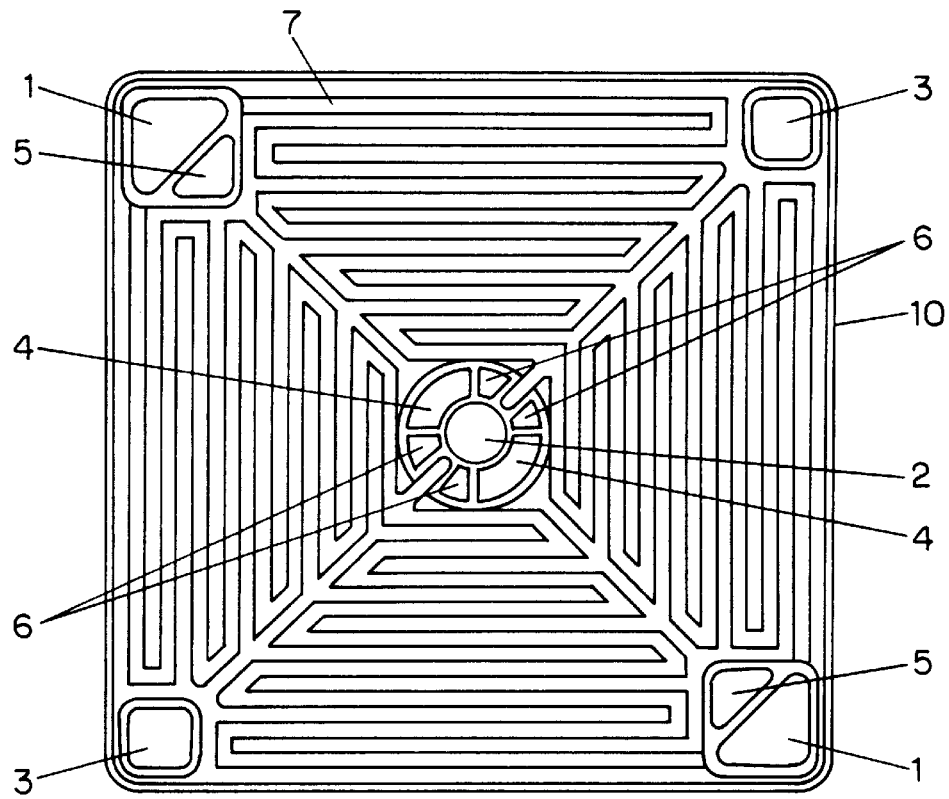
FIG. 2(a) is a plan view of a square cathode side separator, as viewed from the side of the cathode electrode, according to a second preferred embodiment of the present invention.
Figure 2B:
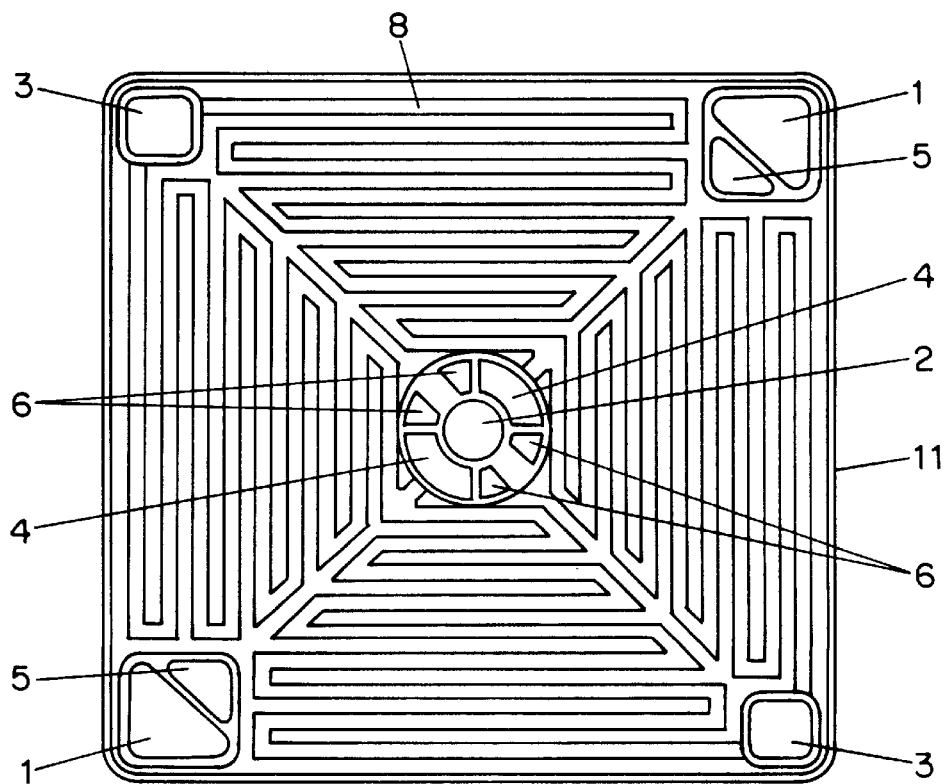
FIG. 2(b) is a plan view of a square anode side separator, as viewed from the side of the anode electrode, according to the second preferred embodiment of the present invention.

FIGS. 2(a) and 2(b) show square separators 10 and 11 in accordance with a second preferred embodiment of the present invention. As shown in FIGS. 2(a) and 2(b), the second preferred embodiment relates to square separators 10 and 11 for use in a square fuel cell laminate. A pair of oxidant gas inlets 1 and coolant inlets 5 are formed in opposite diagonal corners on the square separators 10 and 11. A pair of fuel gas inlets 3 are formed in the other opposite diagonal corners of the square separators 10 and 11. The square separators 10 and 11 also include an oxidant gas outlet 2, two fuel gas outlets 4, and four coolant outlets 6 formed in a central region of the square separators 10 and 11. The oxidant gas supplied to the oxidant gas inlets 1 flows through the serpentine oxidant gas conduits 7 to the central region of the separator, and is then ejected through the oxidant gas outlet 2.

Likewise, the fuel gas supplied to the fuel gas inlets 3 flows through the serpentine fuel gas conduits 8 to the central region of separator 11, where it is ejected through the fuel gas outlets 4. Similarly, the coolant supplied to the coolant inlets 5 flows through the coolant conduit of the square separators 10 and 11. The coolant conduit 8 is formed by laminating the square separators 10 and 11 with their back sides contacting each other. The coolant is then ejected through the four central coolant outlets 6.

As with the circular separators of FIGS. 1(a) and 1(b), the temperature of the square separators 10 and 11 of FIGS. 2(a) and 2(b) rise monotonically in the direction from the peripheral region to the central region of the separators 10 and 11. Since the fuel gas and oxidant gas temperatures also rise near the respective outlets 2 and 4, moisture in the fuel and oxidant gases is prevented from condensing and liquefying, and thus deterioration of the cell performance is avoided.

Although not shown in the second preferred embodiment, a continuous coolant path may be formed by providing the curved portions of conduits 7 or 8 with protrusions 9 for reducing the depth of the conduits 7 or 8. By forming a continuous coolant conduit, uniform cooling in the separator plane is further facilitated and the cell performance is further improved.

Consequently, solid polymer electrolyte fuel cells with fuel cell laminates utilizing the separators shown in FIGS. 1(a) through 2(b) exhibit excellent cell performance. The improved cell performance is realized in part by forcing the reactant gases and the coolant to flow from a peripheral region of the fuel cell laminate to a central region. In this manner, power generating efficiency is not lowered by moisture in the reactant gases condensing and liquefying near the reactant gas outlets. Cell performance is further enhanced by providing a continuous coolant conduit for uniform cooling in the electrode plane.

Figure 3A:
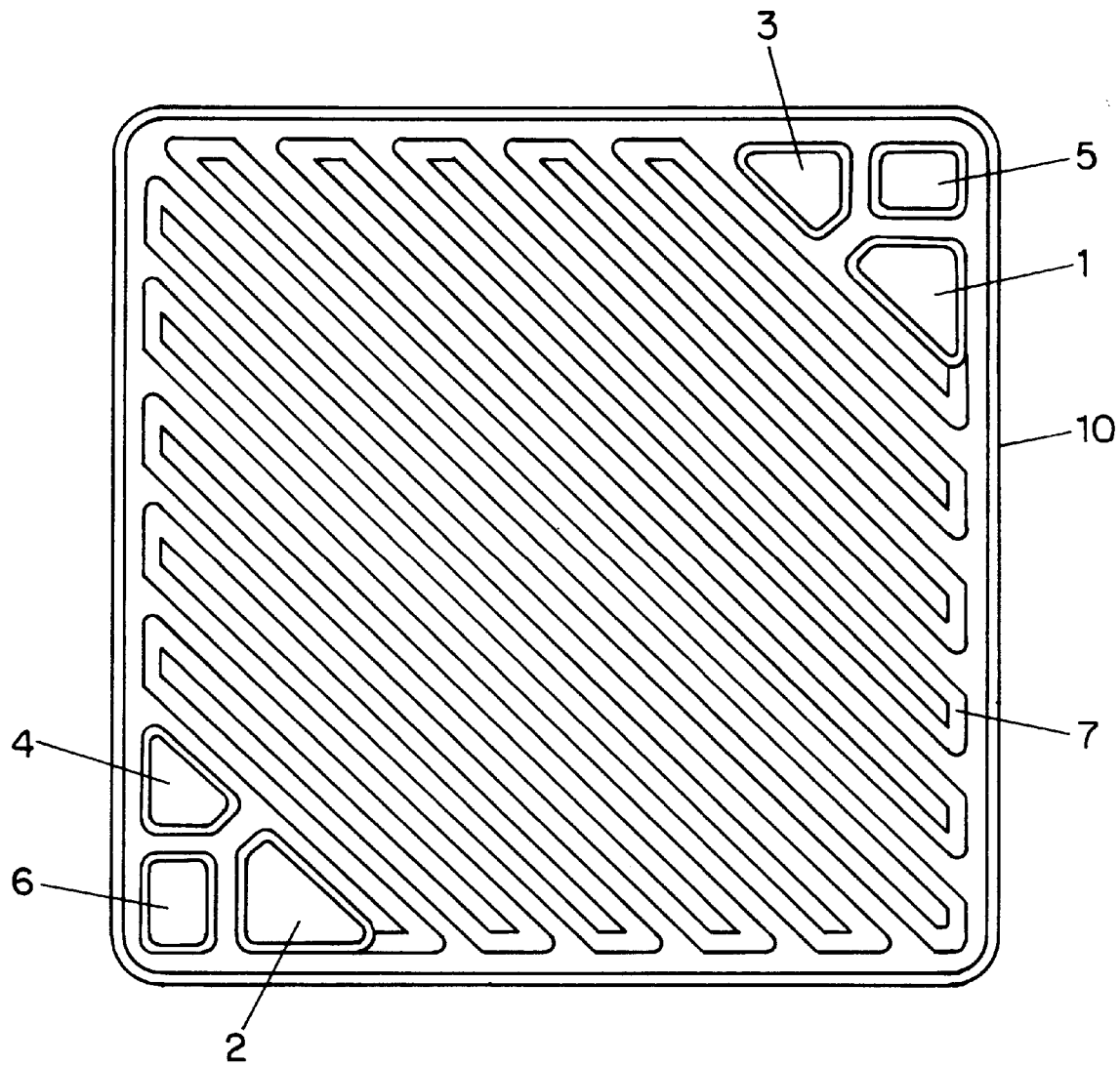
FIG. 3(a) is a plan view of a square cathode side separator, as viewed from the side of the cathode electrode, according to a third preferred embodiment for a fuel cell laminate of the present invention.
Figure 3B:
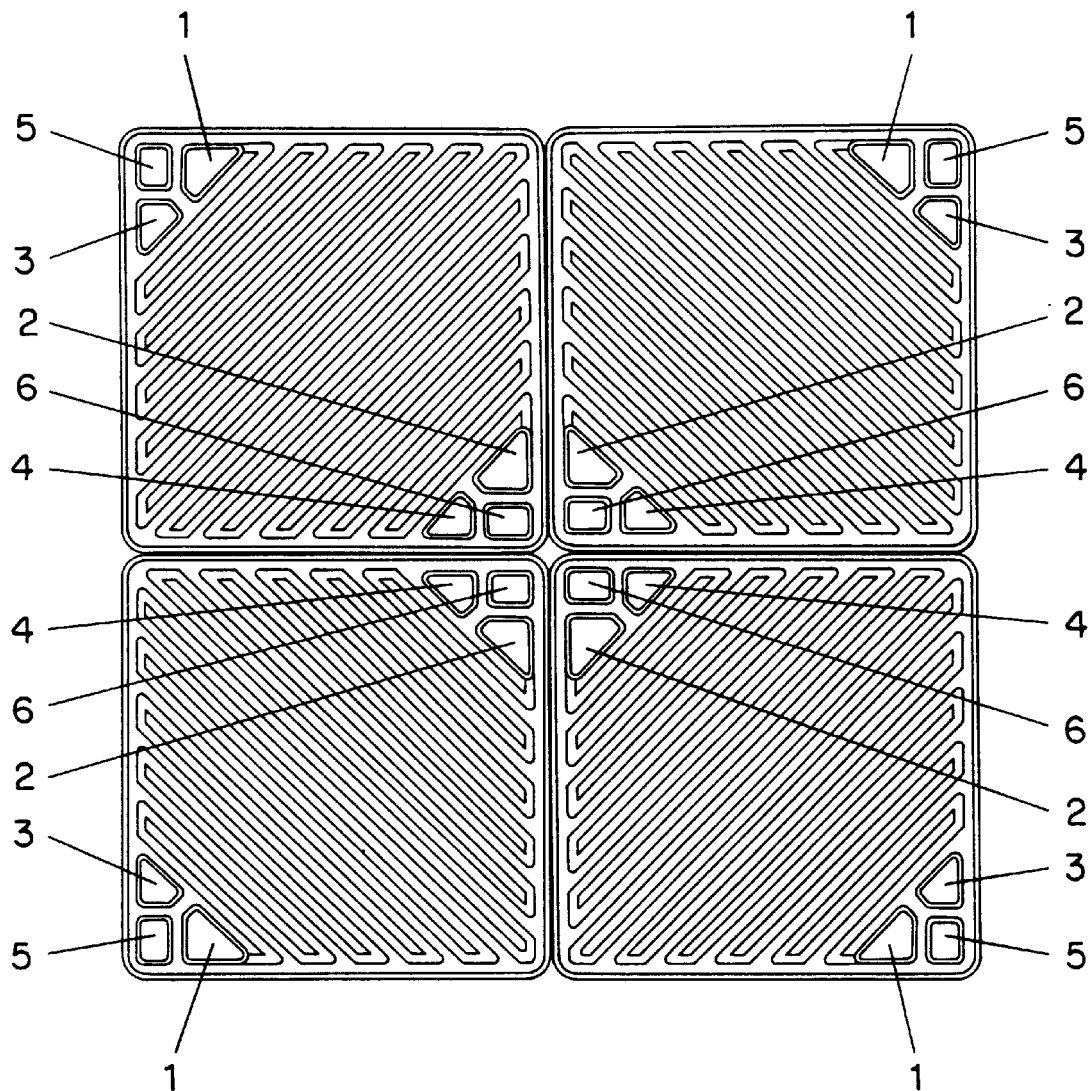
FIG. 3(b) is a plan view of an arrangement of square cathode side separators in a fuel cell composite having four square cell laminates according to the third preferred embodiment of the present invention as shown in FIG. 3(a)
Figure 4:
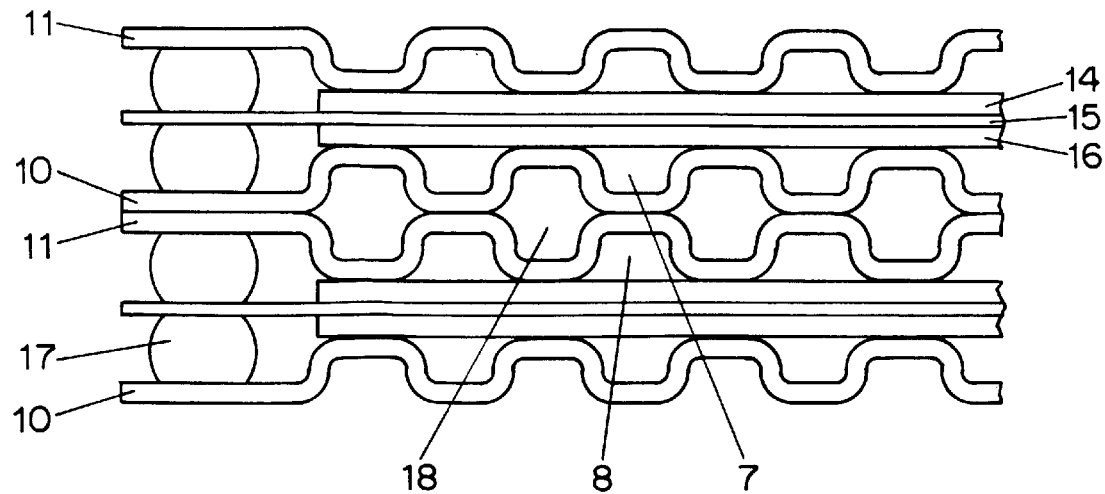
FIG. 4 is a cross-sectional view schematically showing the basic unit cell structure of a conventional solid polymer electrolyte fuel cell.
Figure 5:
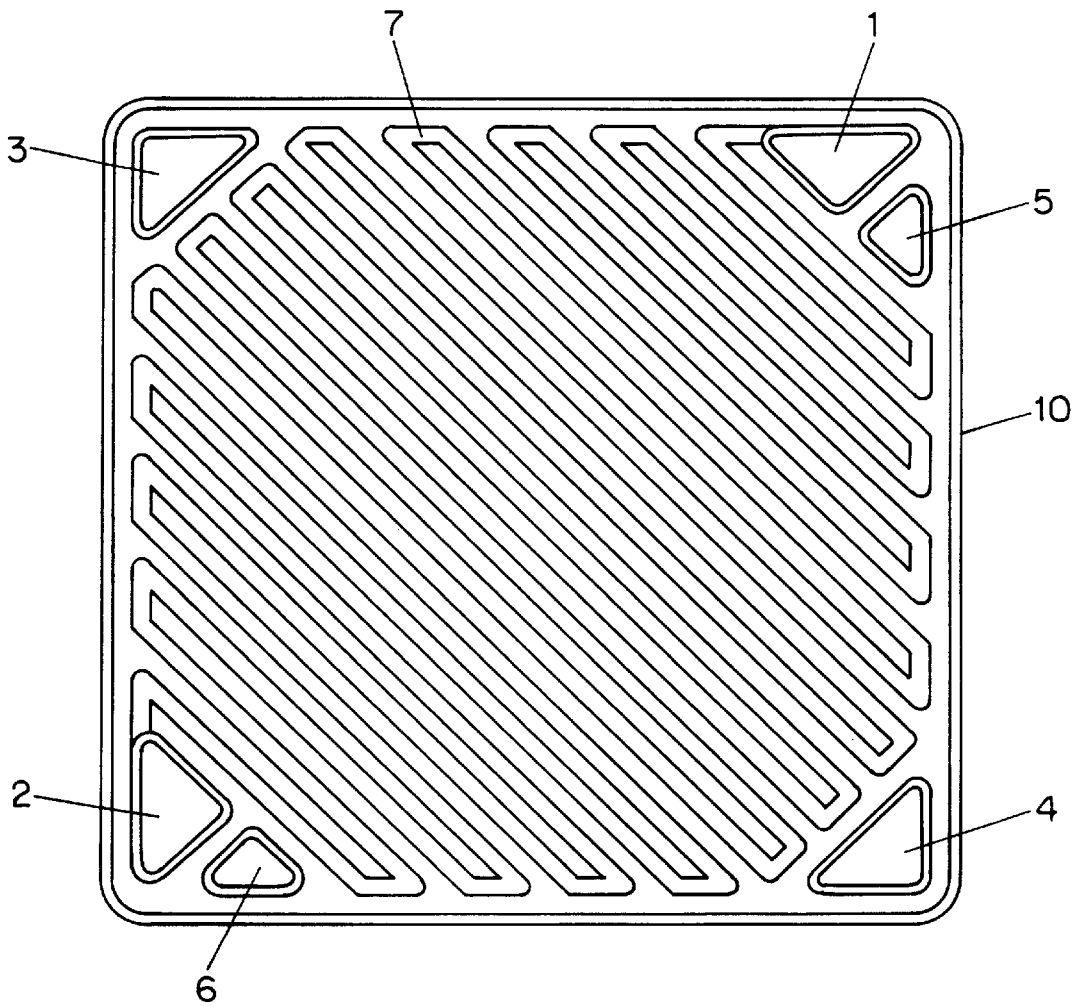
FIG. 5 is a plan view of a conventional separator structure.
Figure 6A:
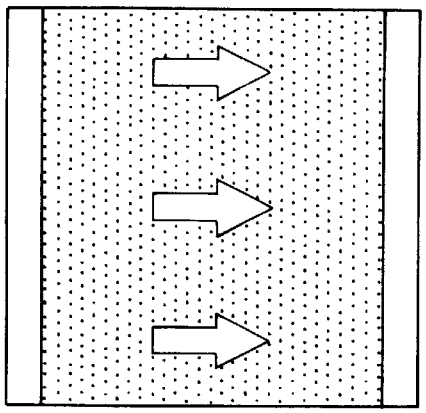
FIG. 6(a) is a diagram illustrating the flow of coolant in a conventional solid polymer electrolyte fuel cell.
Figure 6B:
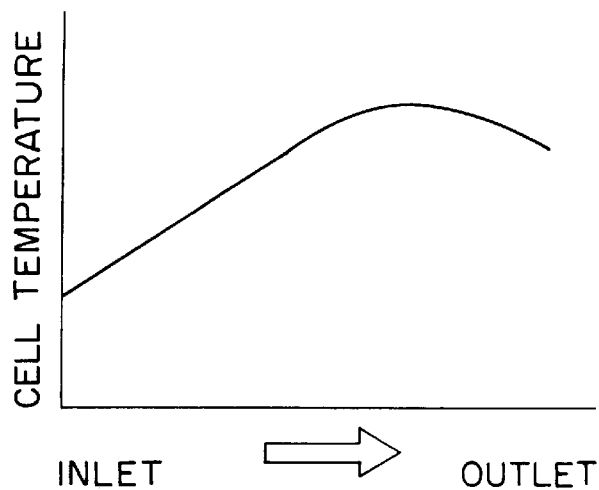
FIG. 6(b) is a graph showing the cell temperature distribution in the direction of coolant flow path as shown in FIG. 6(a)
Figure 7:
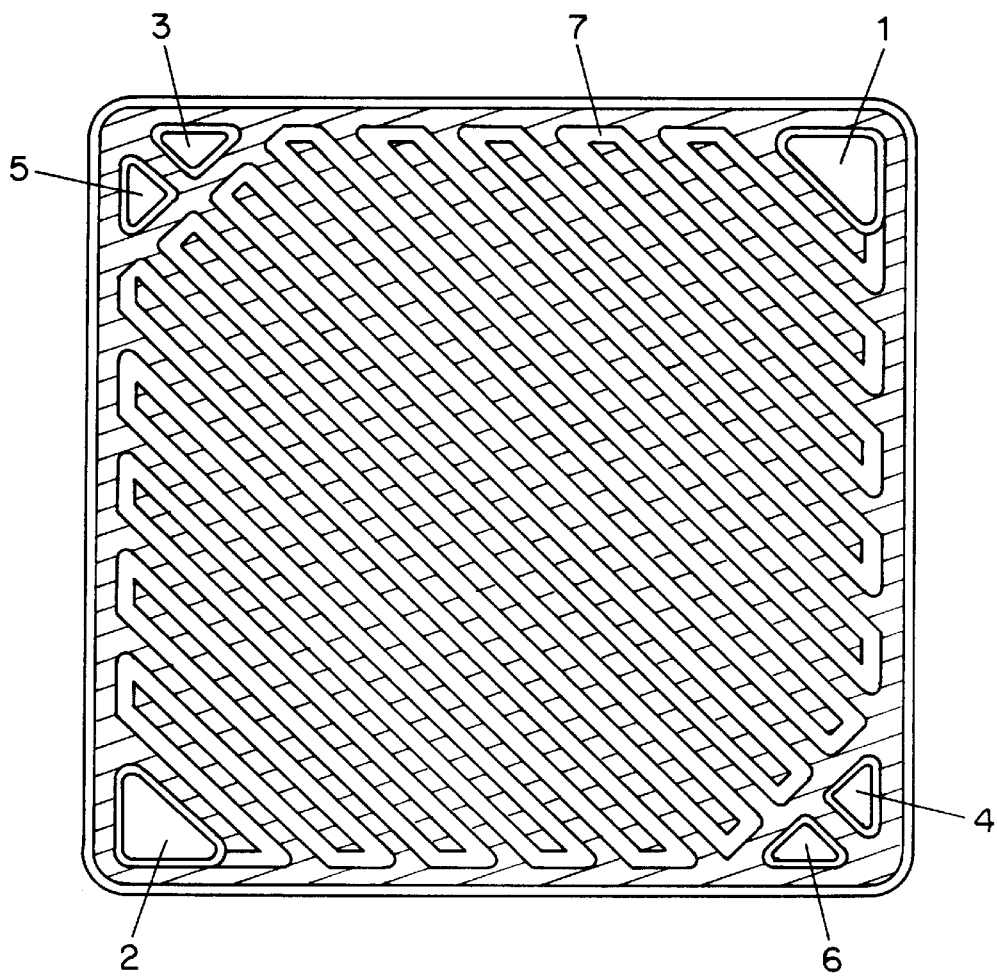
FIG. 7 is a plan view of a separator showing the flow path of the coolant in a conventional solid polymer electrolyte fuel cell.
Figure 8:
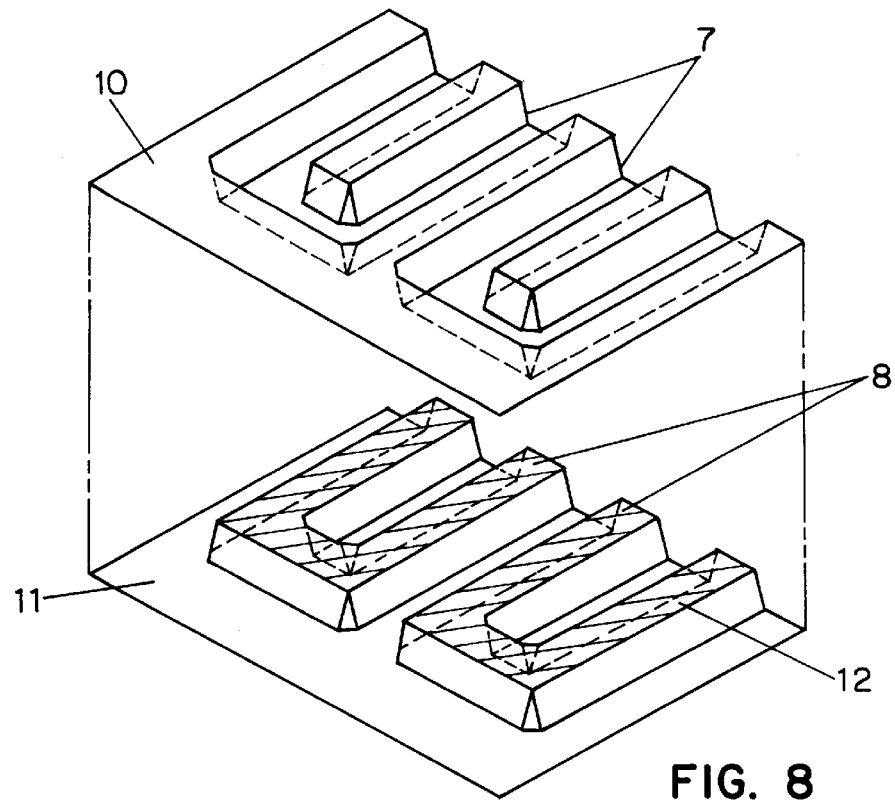
FIG. 8 is a perspective view showing a combination of the adjoining separator plates of a conventional solid polymer electrolyte fuel cell.
Figure 9:
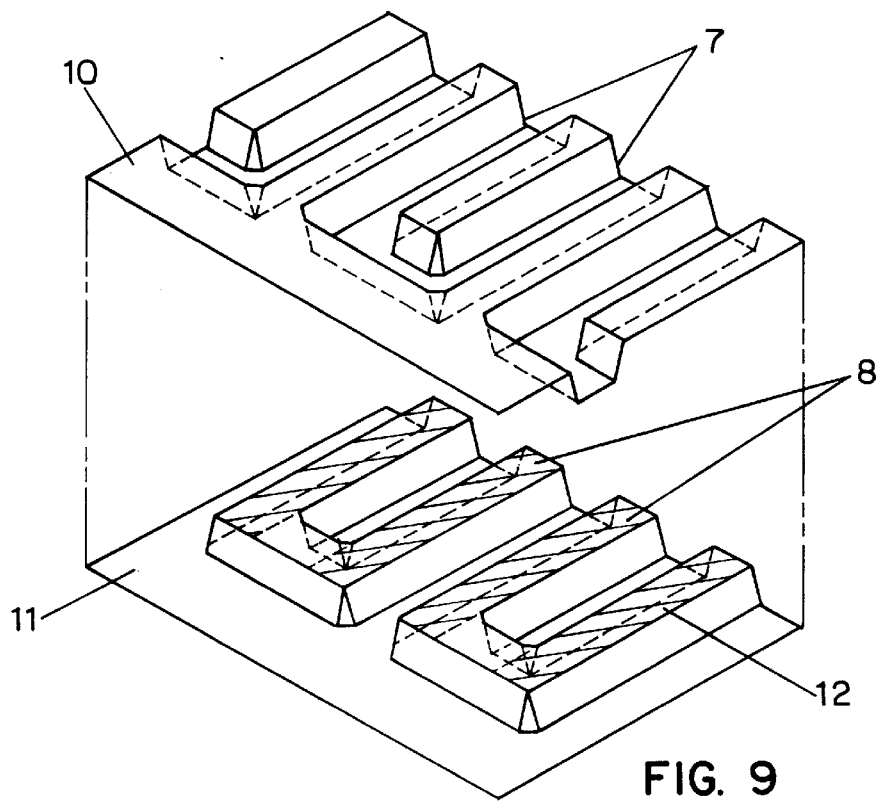
FIG. 9 is a perspective view showing another combination of the adjoining separator plates of a conventional solid polymer electrolyte fuel cell.

FIGS. 3(a) and 3(b) show square separators 10 and 11 in accordance with a third preferred embodiment of the present invention. As shown in FIG. 3(a), separator 10 includes an oxidant gas inlet 1, a fuel gas inlet 3, a coolant inlet 5, an oxidant gas outlet 2, a fuel gas outlet 4 and a coolant outlet 6. The oxidant gas inlet 1, fuel gas inlet 3 and coolant inlet 5 are located in a first corner of the separator 10. The oxidant gas outlet 2, fuel gas outlet 4 and coolant outlet 6 are located in a second corner diagonally across from the first corner. The oxidant gas supplied from the oxidant gas inlet 1 flows to the oxidant gas outlet 2 through an oxidant gas conduit 7 formed as a recess winding on the separator 10. The fuel gas supplied from the fuel gas inlet 3 flows to the fuel gas outlet 4 through a fuel gas conduit 8 formed as a recess (not shown) on the anode side separator (not shown). The coolant supplied to the coolant inlet 5 passes to the coolant outlet 6 through the conduits formed between the adjoining separators.

FIG. 3(b) shows a fuel cell composite comprising a arrangement of fuel cell laminates utilizing the separator 10 of FIG. 3(a). In the arrangement shown in FIG. 3(b), the oxidant gas inlets 1, fuel gas inlets 3 and coolant inlets 5 are located in a peripheral region of the fuel cell composite. The oxidant gas outlets 2, fuel gas outlets 4 and coolant outlets 6 are located in a central region of the fuel cell composite.

Due to the arrangement shown in FIG. 3(b), the temperature of the fuel cell composite in the separator plane rises monotonically toward the central region of the fuel cell composite. Since the temperatures of the oxidant gas and fuel gas also rise near the respective outlets, the moisture in the oxidant gas and fuel gas is prevented from condensing and liquefying and thus deterioration of cell performance is avoided.

Also, a continuous coolant conduit can be formed by providing the curved portions of the conduits 7 or 8 with protrusions 9 for reducing the depth of the conduits 7 or 8. The continuous coolant conduit further facilitates uniform cooling in the separator plane and improves cell performance.

Consequently, solid polymer electrolyte fuel cells utilizing the aforementioned fuel cell composite exhibit excellent cell performance. The improved cell performance is realized in part by forcing the reactant gases and the coolant to flow from a peripheral region of the fuel cell composite to a central region. In this manner, power generating efficiency is not lowered by condensation and liquefaction of moisture in the reactant gases near the reactant gas outlets. Cell performance is further enhanced by providing a continuous coolant conduit for uniform cooling in the electrode plane.

In addition, the solid polymer electrolyte fuel cell of the present invention utilizes a fuel cell composite that is characterized by a compact size and low manufacturing costs. These features are possible because uniform cooling in the electrode plane is realized without employing additional elements. Instead, uniform cooling in the present invention is realized by forming continuous coolant conduits from the reactant gas conduits and protrusions locally disposed to reduce the depth of the reactant gas conduits.

Although the present invention has been described in connection with particular embodiments thereof, it is to be understood that such embodiments are susceptible of modification and variation without departing from the inventive concept disclosed. All such modifications and variations, therefore, are intended to be included within the spirit and scope of the appended claims.

I claim:

1. A solid polymer electrolyte fuel cell comprising a fuel cell laminate forming a plurality of unit cells, each of said unit cells comprising:

a flat electrolyte layer comprising a solid polymer electrolyte film having opposite first and second major surfaces;

an oxidant electrode disposed on said first major surface of said electrolyte layer;

a fuel electrode disposed on said second major surface of said electrolyte layer;

a first separator on the outer surface of said oxidant electrode, said first separator comprising at least one oxidant gas conduit adjacent to said oxidant electrode for conveying oxidant gas for electrochemically generating electric power;

a second separator on the outer surface of said fuel electrode, said second separator comprising at least one fuel gas conduit adjacent to said fuel electrode for conveying fuel gas for electrochemically generating electric power;

at least one coolant conduit between adjoining first and second separators for conveying a coolant for cooling said fuel cell;

at least one coolant inlet arranged in a peripheral region of said fuel cell laminate;

at least one coolant outlet arranged in a central region of said fuel cell laminate;

at least one oxidant gas inlet arranged in said peripheral region of said fuel cell laminate;

at least one oxidant gas outlet arranged in said central region of said fuel cell laminate;

at least one fuel gas inlet arranged in said peripheral region of said fuel cell laminate; and at least one fuel gas outlet arranged in said central region of said fuel cell laminate; said coolant, said oxidant gas and said fuel gas being introduced through said respective inlets and flowing from said peripheral region to said respective outlets in said central region.

2. The solid polymer electrolyte fuel cell according to claim 1, wherein:

said oxidant gas conduit comprises a recess formed on the side of said first separator lying adjacent to said oxidant electrode;

said fuel gas conduit comprises a recess formed on the side of said second separator lying adjacent to said fuel electrode;

said coolant conduit comprises recesses formed on the sides of said first and second separators facing away from said oxidant and fuel electrodes; and said oxidant and fuel gas conduits comprising a plurality of protrusions locally disposed therein in either or both of said oxidant and fuel gas conduits for reducing the depth of said oxidant gas and fuel gas conduits, respectively.

3. The solid polymer electrolyte fuel cell according to claim 1, wherein said first and second separators are substantially circular in plan view.

4. The solid polymer electrolyte fuel cell according to claim 1, wherein said first and second separators are substantially square in plan view.

5. A solid polymer electrolyte fuel cell comprising a fuel cell composite, forming a plurality of fuel cell laminates, each of said fuel cell laminates comprising a plurality of unit cells, each of said unit cells comprising:

a flat electrolyte layer comprising a solid polymer electrolyte film having opposite first and second major surfaces;

an oxidant electrode disposed on said first major surface of said electrolyte layer;

a fuel electrode disposed on said second major surface of said electrolyte layer;

a first separator on the outer surface of said oxidant electrode, said first separator comprising at least one oxidant gas conduit adjacent to said oxidant electrode for conveying oxidant gas for electrochemically generating electric power;

a second separator on the outer surface of said fuel electrode, said second separator comprising at least one fuel gas conduit adjacent to said fuel electrode for conveying fuel gas for electrochemically generating electric power;

at least one coolant conduit between adjoining first and second separators for conveying a coolant for cooling said fuel cell;

at least one coolant inlet arranged in a peripheral region of said fuel cell composite;

at least one coolant outlet arranged in a central region of said fuel cell composite;

at least one oxidant gas inlet arranged in said peripheral region of said fuel cell composite;

at least one oxidant gas outlet arranged in said central region of said fuel cell composite;

at least one fuel gas inlet arranged in said peripheral region of said fuel cell composite; and at least one fuel gas outlet arranged in said central region of said fuel cell composite; said coolant, said oxidant gas and said fuel gas being introduced through said respective inlets and flowing from said peripheral region to said respective outlets in said central region.

6. The solid polymer electrolyte fuel cell according to claim 5, wherein:

said oxidant gas conduit comprises a recess formed on the side of first separator lying adjacent to said oxidant electrode;

said fuel gas conduit comprises a recess formed on the side of said second separator lying adjacent to said fuel electrode;

said coolant conduit comprises recesses formed on the sides of said first and second separators second sides, said first and second separator second sides facing away from said oxidant and fuel electrodes, respectively; and said oxidant and fuel gas conduits comprising a plurality of protrusions locally disposed therein in either or both of said oxidant and fuel gas conduits for reducing the depth of said oxidant gas and fuel gas conduits, respectively.

7. The solid polymer electrolyte fuel cell according to claim 5, wherein said first and second separators are substantially circular in plan view.

8. The solid polymer electrolyte fuel cell according to claim 5, wherein said first and second separators are substantially square in plan view.

* * * * *